June 15, 1926.
W. TELFER
STEAM TRAP
Filed March 21, 1925
1,588,919
2 Sheets-Sheet 1
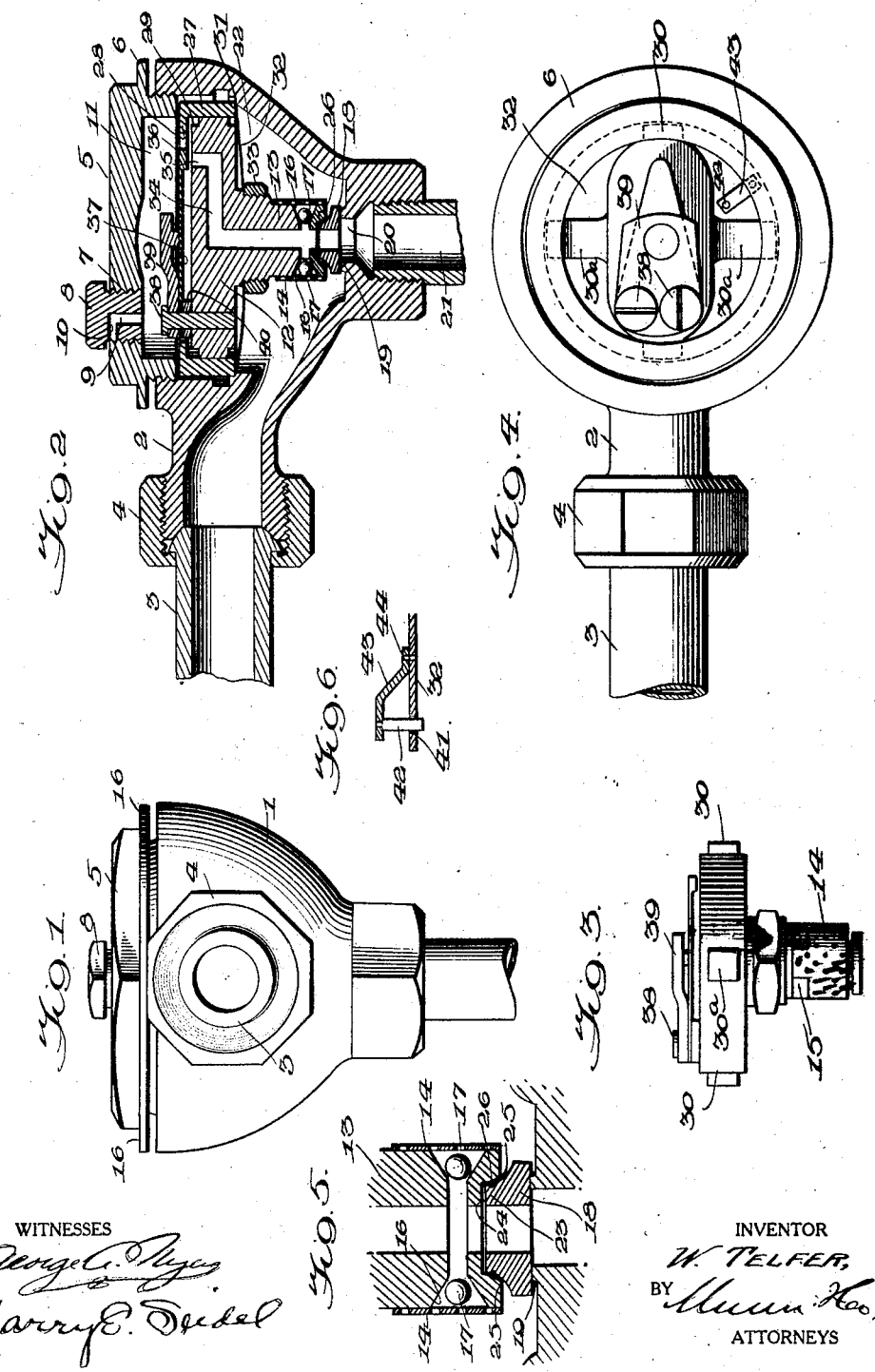

June 15, 1926.

W. TELFER

STEAM TRAP

Filed March 21, 1925

WITNESSES

INVENTOR
WILTON TELFER,
BY
ATTORNEYS

Patented June 15, 1926.

1,588,919

UNITED STATES PATENT OFFICE.

WILTON TELFER, OF NINETTE, MANITOBA, CANADA.

STEAM TRAP.

Application filed March 21, 1925. Serial No. 17,303.

This invention relates to improvements in steam traps, and has for its object to provide a device that will operate from low to high temperature without necessitating any adjustment and which is so designed that it will not be damaged in any way by varying pressures or temperatures.

Another object of the invention is to provide a sensitive and positive acting device which will drain the waters of condensation very quickly and will automatically drain when the steam is being cut off, and which, by manual manipulation the trap may be caused to drain at any time regardless of the temperature or pressure.

A further object of the invention is the provision of a trap which may be opened wide to blow steam through, thereby cleaning out any sediment in the trap and keep ing the seat free from dirt.

A still further object of the invention is to provide a trap which will hold condensation at a comparatively low temperature.

Another object of the invention is to construct an effectively operating trap in which no volatile liquid or gas is used, and further to generally arrange structural details such that the parts can be easily and quickly assembled or dismantled and the trap manufactured at comparatively small cost and with few parts to get out of order.

Other objects include the provision of a trap of small size which will take care of large volume of radiation.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in elevation of the trap constructed according to the principles of my invention.

Figure 2 is a vertical section of the trap.

Figure 3 is a detached view in elevation of the working parts of the device.

Figure 4 is a plan view of the trap.

Figure 5 is an enlarged vertical section of the valve cage of the trap.

Figure 6 is a detail of a pin for cleaning a passage in the diaphragm.

Figure 7:
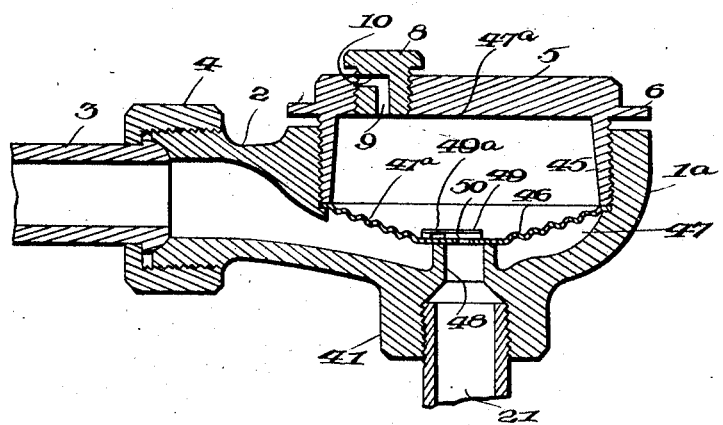
Figure 7 is a sectional view of a modified but simple form of the invention.

Referring more particularly to the drawings, 1 designates a casing embracing the trap which has a threaded nipple 2 connected to a steam inlet pipe 3 by a union 4. The upper end of the casing is open and internally threaded to receive a closure 5 provided with an annular flange 6 adapted when required to force a gasket in sealing relation with the upper open end of the casing 1.

The cover is provided with a threaded opening 7 to receive a plug 8. This plug has a vertical passage 9 opening into a horizontal passage 10 which is adapted to be placed in communication with the atmosphere when the plug has been sufficiently unscrewed or elevated with respect to the closure 5 and releases steam pressure from a chamber 11 located in the upper portion of the casing 1.

The main supporting structure of the device comprises a plunger formed of a flat elongated block 12 and a cylindrical depending portion 13. A perforated cylindrical strainer or screen 14 is secured to the lower free end of the projection 13 and is held in place by a split brass ring 15 (Figure 3) mounted in a groove in the projection 13. The lower end of said projection is provided with flaring ports 16 adapted to be normally closed by ball valves 17. A bronze seat 18 normally rests on a boss 19 at the discharge port 20 of the exhaust conduit 21 for the release of condensed steam from the lower chamber 22 of the casing 1. The seat 18 has a reduced portion 23 projecting into a pocket 24 in the lower end of the projection 13. The seat 18 and pocket have cooperative rounded portions engaging each other as shown at 25 and a spring ring 26 tends to force the seat 18 from the pocket 24.

The normal position of the trap when not in use is a closed one, that is the trap is seated and therefore it will require a small degree of pressure to raise the diaphragm and valve 18 and release the condensation into the discharge conduit 21. Where the trap is connected to the steam pipes of an ash pit of a locomotive and where the temperature is below freezing point and the steam is shut off for some reason, condensation would be released in the trap until the pressure is reduced to probably four ounces when the trap would seat in its normal position and some condensation would then be held in the chamber 22 which would freeze and cause the trap to be inoperative. However, the ball valves 17 release its water of condensation from chamber 22 when the same is at a high temperature and thus prevent chamber 22 under certain conditions at any time from becoming filled with ice. These ball valves are not required in general use but as stated above only where there is danger of freezing.

A brass ring 27 has an inturned flange 28 adapted to engage a boss 29 on the block 12 to limit the upward movement of said block. Guides in the form of lugs 30 and 30ª radially project from the periphery of the block and engage the inner wall of the ring 27. The ring rests on a shoulder 31 and is held in place by the cover 5. A diaphragm 32 is clamped at its periphery on the shoulder 31 by the ring 27 and closure 5. The central portion of the diaphragm is perforated to receive the projection 13 and the metal of the diaphragm at the perforation is clamped to a shoulder on the projection by a nut 33 thus dividing the casing 1 into the two chambers 11 and 22.

The projection 13 and block 12 are provided with a passage 34 having a port 35 closed automatically by a valve 36. The passage opens into the flared ports 16 at the lower end of the projection 13. The valve 36 is carried at one end of a thermostatic device 37 and has its lower face inclined so that it will properly seat on the port 35. Pins 38 secured in the head or block 12 hold the thermostatic element 37 in place as well as a stop 39 which limits the outward movement of the element 37. The thermostatic element is formed as is usual of two strips of metal having different thermal coefficients. A washer 40 elevates the elements 37 at the pin 38 sufficiently to give freedom of operation of the same.

The diaphragm 32 has a restricted opening 41 into which is adapted to project the free end of a pin 42 carried by a spring 43 secured at 44 to the diaphragm. The opening 41 forms a passage at times for steam and the pin 42 being forced through said opening removes any foreign matter and maintains the passage clear.

The operation of my device is as follows:

Assuming that the parts are initially in the position shown in Figure 2, that is the trap is seated and the ball valves are open and steam is admitted to the radiator and therefore to the inlet pipe 3. In the beginning there is no condensation in the trap and the steam entering the lower chamber 22 seats the ball valves 17 and acts to raise the diaphragm 32 which is connected to the projection 13 of the plunger in the casing 1. The elevation of the plunger raises the valve 18, releasing what condensation has occurred since the admission of steam and thereby reducing the pressure from the lower chamber 22 into the discharge conduit 21. In the meanwhile the metal forming the trap is being heated to a higher temperature as steam vapor of a higher temperature is travelling through the perforation 41 of the diaphragm 32 and entering the chamber 11 and down through the passage 34 and into the discharge pipe 21. When the thermostatic device 37 is heated to approximately 210° it operates and forces the valve 36, closing port 35 to the passage 34 and since the pressures in chambers 11 and 22 are equalized the spring diaphragm moves down with the valve 18 to its seat which is its normal position. Since the pressure in chamber 11 acts upon a larger area than the pressure in chamber 22, valve 18, when seated, is held tightly in position.

When the condensation or saturated steam cools in the trap and the temperature is reduced in the upper chamber 11 the thermostatic element 37 is effected to slightly release the valve 36 from the port 35 so that the upper chamber is in restricted communication with the discharge pipe 21 and since the equalization of the pressures upon opposite sides of the diaphragm has been slightly broken, the upper chamber having less pressure than the lower chamber, the higher pressure in the lower chamber 22 acts to raise the diaphragm 32 which is connected to the projection 13 of the plunger in the casing 1 and the elevation of the plunger raises the valve 18 slightly and releases the condensation of the trap and the radiator through the discharge conduit 21, until a higher temperature steam reaches the trap and passes through the perforation 41 of the diaphragm filling chamber 11 and raising the temperature of said chamber so that the thermostatic element 37 is brought into play for actuating the valve 36 to close the port 35. The plunger 13 is then moved downwardly forcing the valve 18 upon its seat and closing chamber 22 to the discharge outlet 21.

It must be borne in mind that the larger the cross sectional area of passage 34 and the smaller the perforation 41 in the diaphragm the more sensitive the trap will be to variation in temperature. Thus it will be seen that condensation may be discharged at either a high temperature or at a greatly reduced temperature and the trap will operate to as great a pressure as 100 pounds or more without requiring any adjustments or without causing any damage to the same.

Furthermore it is evident from the construction that there is no possibility of the trap blowing steam, thereby making it particularly economical in the saving of fuel. If it be desired to retain condensation in order to obtain the greater heat value the perforation 41 in the diaphragm may be enlarged. This will cause a reduction in the sensitiveness of the trap and condensation will be retained until a sufficiently low temperature is had to cause contraction of the thermostatic element 37 and thus open the valve 36 from port 35 and release condensation in large quantities.

The pin 42 operating in the perforation 41 is intended to maintain the perforation open in order that steam may pass from chamber 22 into chamber 11. If the perforation became clogged the pressure in the upper and lower chamber would never equalize and the trap would accordingly become inoperative. The spring supporting piece of the pin 42 is adapted to be engaged by the flange 28 of the cylindrical ring 27 when the diaphragm is moved upwardly and thereby causing a downward movement of the pin 42 through the perforation 41.

It will be noted that the ring 26 is mounted in grooves which are semi-circular in cross section in the lower end of the plunger 13 and the valve 18 so that when the ring 26 is expanded in position in the groove it will support the valve 18 on the bottom of the plunger 13 and the rounded portions 25 cooperate with the similarly rounded portions in the pocket 24 at the lower end of the plunger 13 and are adapted to seal the valve against the escape of steam from the chamber 22 to the discharge conduit 21.

The metal diaphragm may be made of brass or any other suitable material for the purpose and may have a plain surface or be corrugated as desired.

Referring more particularly to Figure 7 a modified form of the trap is disclosed in which the casing $1^a$ is provided with a threaded opening into which is adapted to be screwed the threaded flange 45 of the closure 5 for locking the diaphragm 46 in position and dividing the interior of the casing into two chambers 47 and $47^a$. The lower casing 47 is provided with a port 48 opening into the conduit 21 which is screwed into an internally threaded nipple 41 of the casing $1^a$. The port has a valve seat upon which the flat central portion of the diaphragm 46 rests and an opening 50 in this portion of the diaphragm connects the chamber 47 with the chamber $47^a$. A valve 49 operated by a thermostat $49^a$ controls the port 50. The diaphragm is provided with a small perforation $41^a$ which maintains the chambers 47 and $47^a$ in constant but restricted communication. The operation of this structure is identical broadly with the structure shown in Figure 2.

Figure 8:
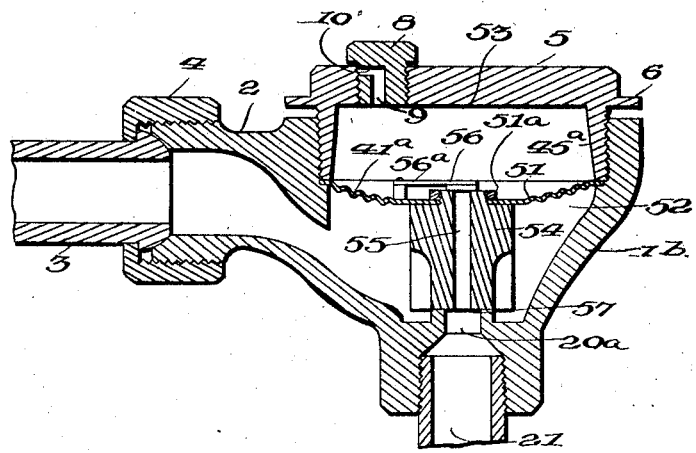
Figure 8 is a still further modification of the device shown in Figures 1 to 6 inclusive.

A further modified form is shown in Figure 8 in which the diaphragm 51 is provided with an internally threaded boss $51^a$ into which is screwed the threaded end of the valve 54. The daphragm, as in the structure shown in Figures 2 and 7 divides the interior of the casing $1^b$ into chambers 52 and 53, the diaphragm being held in position by means of the threaded annular flange $45^a$ of the cap closure 5. The valve 54 is provided with a central passage 55 which connects the port $20^a$ in communication with the pipe 21 with chamber 53. The passage being controlled by the valve 56 operated by a thermostat $56^a$ connected directly to the diaphragm 51. The chambers 52 and 53 are in restricted communication through a port $41^a$ in the diaphragm 51. The thermostat $49^a$ of Figure 7 as is the thermostat $56^a$ of Figure 8 is connected directly to the diaphragm 46.

What I claim is:

1. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the comunication between the first mentioned chamber and the passage in the plunger, a thermostatic element for automatically operating the valve for closing the passage in the plunger whereby the plunger is operated by the pressure of the steam in the first mentioned chamber, and a valve carried by the plunger for controlling communication between the second chamber and the discharge port.

2. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, the plunger being provided with ports connecting the passage in the plunger with the second chamber, and valves actuated by the steam pressure for closing the ports.

3. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, and means in the path of the restricted passage in the diaphragm adapted to be forced through the restricted passage to maintain said restricted passage free of foreign matter.

4. A trap comprising a casing having an inlet port, and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, a sleeve in the casing, and lugs carried by the plunger and engaging the sleeve for guiding the plunger.

5. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, the plunger being provided with ports connecting the passage in the plunger with the second chamber, valves actuated by the steam pressure for closing the ports, and a strainer carried by the lower end of the plunger and embracing the ports controlled by the last mentioned valve.

6. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, means for closing the valve which controls the upper end of the passage in the plunger, and a valve carried by the plunger for controlling communication between the second chamber and the discharge port.

7. A trap comprising a casing having an inlet port and a discharge port, a diaphragm dividing the casing into two chambers, said diaphragm having a restricted passage for placing the chambers in communication with each other, a pin carried by the diaphragm and adapted to be forced through the restricted passage, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, and means for limiting upward movement of the plunger for causing the pin to be forced through the restricted passage in the diaphragm.

8. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, a sleeve mounted in the casing and adapted to lock the periphery of the diaphragm to the casing, said diaphragm being provided with a central opening to receive the plunger, and means for locking the diaphragm at this point to the plunger.

9. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, and a valve carried by the plunger for controlling communication between the second chamber and the discharge port, said thermostatic element being secured to the plunger.

10. A trap comprising a casing having an inlet and a discharge port, a sleeve mounted in the casing, a diaphragm having its material adjacent its periphery secured to the wall of the casing for dividing the chamber in the casing into an upper and lower compartment, said diaphragm being provided with a central passage, a plunger inserted within the passage and secured to the diaphragm, said plunger having a head provided with projecting lugs engaging the sleeve for guiding the plunger in its movement, said plunger being provided with a passage adapted to connect the upper chamber with the discharge port, said diaphragm being provided with a perforation for placing the upper and lower compartments in communication, a valve, a thermostatic element carrying the valve and adapted under a predetermined temperature for causing the valve to close the upper end of the passage in the plunger, said plunger being provided with ports for placing the lower chamber in communication with the passage in the plunger, valves in the ports adapted when seated, due to pressure of steam in the lower chamber, for closing the passage in the plunger to the lower chamber, the outlet port being in line with the lower end of the plunger, and a valve seat carried by the plunger adapted to engage the port and close communication between the lower chamber and said outlet port.

11. A trap comprising a casing having an inlet port and a discharge port, a diaphragm dividing the casing into two chambers, said diaphragm having a restricted passage for placing the chambers in communication with each other, a plunger carried by the diaphragm, said plunger being provided with a passage connecting one chamber with the discharge port, the other chamber being in communication with the inlet port, a valve for controlling the communication between the first mentioned chamber and the passage in the plunger, a thermostatic element for automatically operating the valve for closing the passage in the plunger whereby the plunger is operated by the pressure of the steam in the first mentioned chamber, a valve carried by the plunger for controlling communication between the second chamber and the discharge port, said casing being provided with a valve for placing the first mentioned compartment in communication with the atmosphere for releasing steam from said compartment.

12. A trap comprising a casing having an inlet port and a discharge port, a diaphragm dividing the casing into two chambers, said diaphragm having a restricted opening for placing the chambers in communication with each other, said diaphragm also having a passage for placing one of the chambers in communication with the discharge port, a thermostatic element and valve adapted to be automatically operated for closing said passage between said chamber and the discharge port.

WILTON TELFER.